March 28, 1950 — G. E. DATH — 2,501,888
FRICTION SHOCK ABSORBING MECHANISM FOR RAILWAY DRAFT RIGGINGS
Filed Sept. 12, 1946 — 2 Sheets-Sheet 1
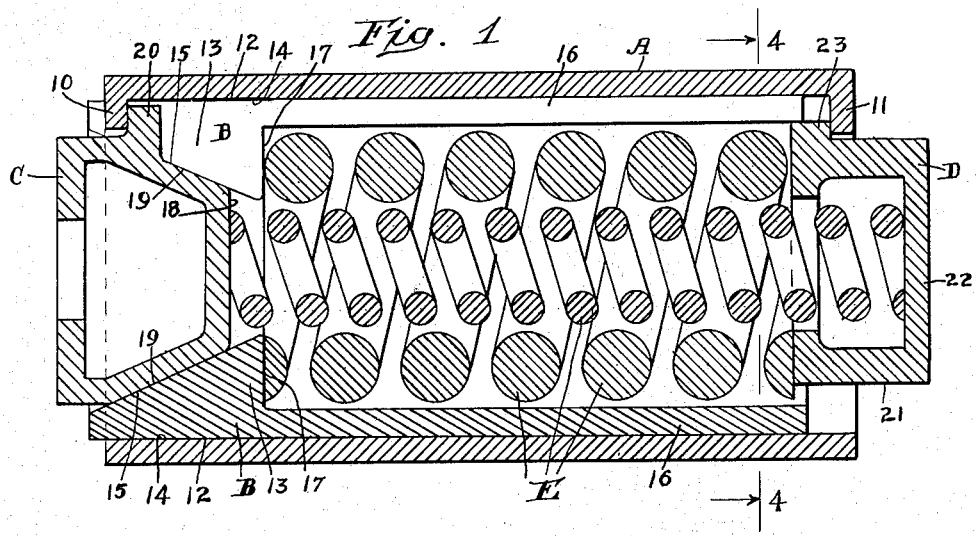
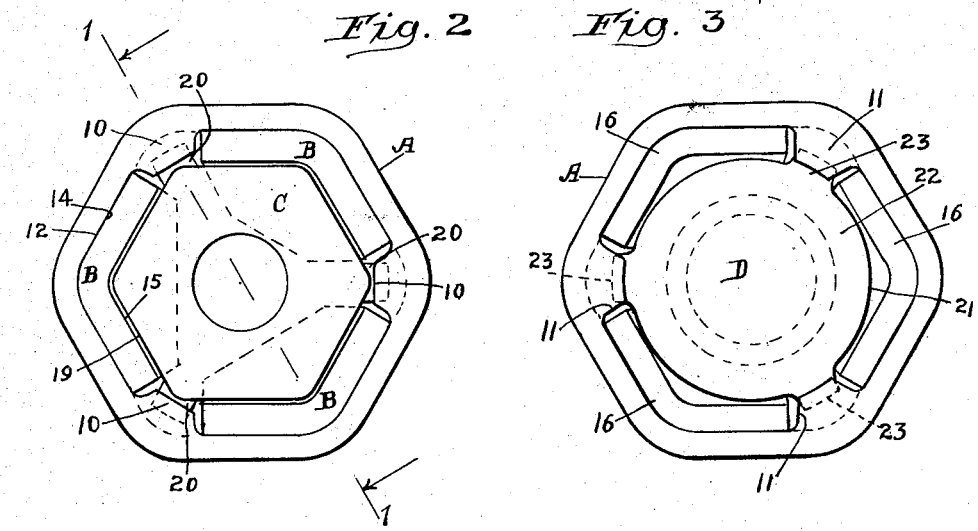
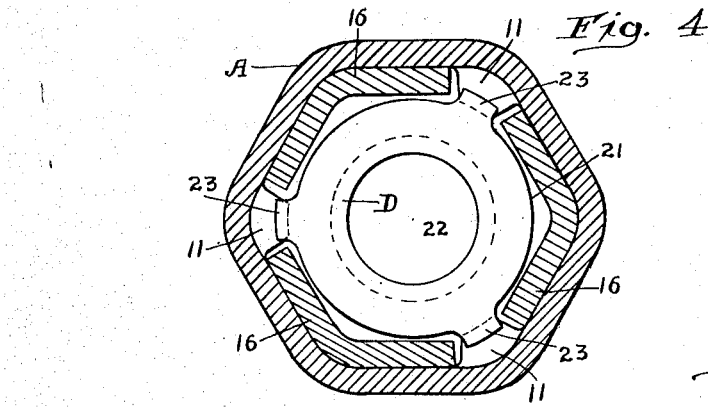
Inventor:
George E. Dath.
By Henry Fuchs.
Atty.

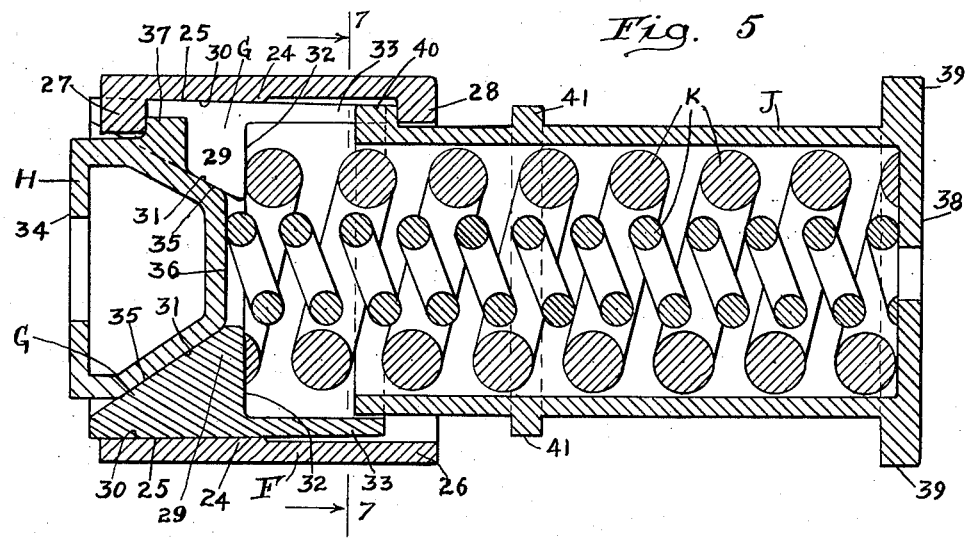

Patented Mar. 28, 1950

2,501,888

UNITED STATES PATENT OFFICE 2,501,888

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application September 12, 1946, Serial No. 696,460

8 Claims. (Cl. 213—34)

1

This invention relates to improvements in friction shock absorbing mechanisms, especially adapted for railway draft riggings.

One object of the invention is to provide a friction shock absorbing mechanism including a friction casing, friction shoes slidingly telescoped within one end of the casing and having frictional engagement therewith, a wedge block in wedging engagement with the shoes, spring means opposing inward movement of the shoes, and a movable member telescoped within the other end of the casing having its inward movement opposed by the spring means to provide for preliminary light action, wherein the movable member has its outward movement limited by cooperating stop lugs on said member and casing, and wherein the shoes serve as means for locking the casing and cap against relative rotation to maintain the cooperating lugs thereof in aligned relation.

A further object of the invention is to provide a mechanism, as set forth in the preceding paragraph, wherein relative rotation of the casing and the relatively movable member is prevented by extensions on the shoes engaged and guided between adjacent lugs of the movable member and cooperating means of guide and groove formation on the shoes and casing, restricting the shoes to movement lengthwise of the casing.

A still further object of the invention is to provide a shock absorbing mechanism comprising a tubular friction casing having interior stop lugs at opposite ends, friction shoes slidingly telescoped within one end of the casing, a wedge block having wedging engagement with the shoes, radial lugs on the wedge block engaged with the lugs at said end of the casing to limit outward movement of the block, a lengthwise movable spring cap telescoped within the other end of the casing, having radial lugs engaging the lugs at said end of the casing to limit outward movement of the cap, and spring means within the casing yieldingly opposing movement of the friction shoes and cap inwardly toward each other, wherein the casing is of hexagonal, interior cross section and provided with interior, V-shaped friction surfaces, the shoes having V-shaped friction surfaces interfitting with the friction surfaces of the casing to be held against rotation with respect to the casing, and wherein the shoes engage between adjacent lugs of both the wedge and spring cap to lock the wedge and spring cap against rotation with respect to the casing, thereby maintaining the lugs of the wedge and cap aligned with the stop lugs of the casing.

Other objects of the invention will more clearly

2 appear from the description and claims hereinafter following.

In the accompanying drawings forming a part of this specification, Figure 1 is a longitudinal sectional view of my improved friction shock absorbing mechanism, corresponding substantially to the line 1—1 of Figure 2. Figure 2 is a front elevational view of Figure 1, looking toward the right in said figure. Figure 3 is a rear elevational view of Figure 1, looking toward the left in said figure. Figure 4 is a transverse, vertical sectional view, corresponding substantially to the line 4—4 of Figure 1. Figure 5 is a view similar to Figure 1, illustrating another embodiment of the invention, said view corresponding substantially to the line 5—5 of Figure 6. Figure 6 is a front elevational view of Figure 5, looking toward the right in said figure. Figure 7 is a transverse, vertical sectional view, corresponding substantially to the line 7—7 of Figure 5.

Referring first to the embodiment of the invention illustrated in Figures 1 to 4 inclusive, my improved friction shock absorbing mechanism comprises broadly a friction casing A; three friction shoes B—B—B; a wedge block C; a spring cap D; and a spring resistance E.

The casing A is in the form of a substantially tubular member open at both ends. The casing A is preferably of hexagonal, interior and exterior cross section, as clearly shown in Figures 2, 3, and 4. At the forward end, that is, the left hand end of the casing, as seen in Figure 1, the same is provided with three laterally inwardly projecting stop lugs 10—10—10, which are located at alternate corners of the same. At the open rear end thereof, the casing is provided with a set of three inturned stop lugs 11—11—11, which are at alternate corners of the casing and are longitudinally aligned with the stop lugs 10—10—10. The interior of the casing A presents three lengthwise extending friction surfaces 12—12—12 of V-shaped, transverse cross section, each surface 12 being formed by two adjacent wall portions of the hexagonal casing.

The friction shoes B, which are three in number, are arranged symmetrically about the longitudinal central axis of the mechanism. Each shoe B is laterally inwardly enlarged at the front end, as indicated at 13. On the outer side thereof, each friction shoe has a lengthwise extending friction surface 14 of V-shaped, transverse cross section, which is in sliding engagement with the corresponding V-shaped friction surface 12 of the casing. The enlarged portion 13 of each shoe is provided with a flat wedge face 15 on the inner side of the shoe. The shoes B are elongated, as shown, each shoe having a rearward extension 16, which terminates short of the rear end of the friction casing A. The enlargement 13 of the shoe has a flat, transverse, inner end face 17, which forms an abutment for the front end of the outer coil of the spring resistance E.

The wedge C is in the form of a hollow block having a flat front end face adapted to bear on the front follower of the railway draft rigging. The inner end of the wedge is also formed with a flat face 18, which extends transversely and forms abutment means for the inner coil of the spring resistance E. At the inner end thereof, the wedge has three flat wedge faces 19—19—19, which engage respectively with the wedge faces 15—15—15 of the friction shoes. To limit outward movement of the wedge, the same is provided with three radially projecting lugs 20—20—20, which extend between adjacent shoes and engage in back of the lugs 10—10—10 of the casing.

The spring cap D, which is telescoped within the rear end of the casing, is in the form of a cup-shaped member having a cylindrical side wall 21. At the rear end, the cap D is closed by a transverse end wall 22. To hold the cap D assembled with the casing and limit outward movement thereof, the same is provided with three radially outwardly projecting lugs 23—23—23, which engage in back of the lugs 11—11—11 of the casing.

The spring resistance E, which is within the casing A, comprises an inner light coil and an outer heavier coil. The inner coil of the spring bears at its front end on the end face 18 of the wedge block and has its rear end extending into the spring cap D and bearing on the end wall 22 thereof. The outer coil of the spring bears at its front end on the flat end faces 17—17—17 of the enlargements of the friction shoes and has its rear end bearing on the inner end of the spring cap.

In assembling the mechanism, the spring cap D is first applied by entering the same through the open rear end of the casing A, the same being turned so that the lugs 23—23—23 thereof are disposed to one side of the lugs 11—11—11 of the casing. After the cap has been brought into position with the lugs 23 thereof in back of the lugs 11—11—11 of the casing, it is given a partial turn to register the lugs thereof with the lugs of the casing. The spring resistance E is then placed within the casing through the open front end thereof and the shoes are inserted, being placed around the spring and passed inwardly until the rearward extensions thereof engage between the lugs 23—23—23 of the spring cap, thereby locking the cap against rotation with respect to the casing. The casing is then stood upright on its rear end, resting on a suitable support, which leaves the spring cap free. With the casing thus supported, the shoes are forced inwardly against the resistance of the outer coil of the spring E by any suitable tool, to a position wherein the front ends of the shoes are disposed rearwardly of the lugs 11—11—11 of the casing to provide ample clearance for edgewise passage of the lugs 20—20—20 of the wedge block C therebetween. While the parts are held in this position, the wedge block C is inserted through the open front end of the casing, first having been turned to dispose the lugs 20—20—20 thereof circumferentially to one side of the lugs 10—10—10. After having been pushed inwardly to bring the lugs 20—20—20 rearwardly of the lugs 10—10—10 of the casing, the wedge is given a partial turn to align the lugs thereof with the lugs of the casing. The pressure is then removed from the shoes, permitting the spring E to project the same outwardly to the normal position shown in Figure 1.

The operation of the improved shock absorbing mechanism shown in Figures 1 to 4 inclusive is as follows: As the mechanism is compressed between the followers of the draft rigging, the spring cap D is first forced inwardly against the resistance of the spring E, producing light preliminary action of the mechanism, the friction between the shoes and the casing being sufficiently great during this action to hold the friction clutch against movement inwardly of the casing. Upon the rear follower of the draft rigging coming into engagement with the rear end of the casing, further compression of the mechanism forces the wedge block C inwardly of the casing, spreading the shoes apart and sliding the same inwardly along the friction surfaces of the casing against the resistance of the spring E, thereby providing high shock absorbing capacity. In release, the spring E forces the wedge block C, the shoes B—B—B, and the spring cap D outwardly, thereby restoring the parts to their normal position as shown in Figure 1, outward movement of the wedge block being limited by engagement of the lugs 20—20—20 thereof with the lugs 10—10—10 of the casing and outward movement of the spring cap D being limited by engagement of the lugs 23—23—23 thereof with the lugs 11—11—11 of the casing.

Referring next to the embodiment of the invention illustrated in Figures 5, 6, and 7, my improved friction shock absorbing mechanism comprises broadly a friction casing F; three friction shoes G—G—G; a wedge block H; a movable spring cage J; and a spring resistance K.

The friction casing F is in the form of a relatively short, tubular member open at its front and rear ends. The front end portion of the casing F is preferably of hexagonal, transverse, interior and exterior cross section, the walls of said front end portion being inwardly thickened, as indicated at 24, to provide the friction shell portion proper of the casing. The thickened friction shell portion of the casing presents three rearwardly extending, inwardly converging friction surfaces 25—25—25, which are of V-shaped, transverse section. Rearwardly of the friction shell section, the casing F is preferably of cylindrical, transverse section, as indicated at 26. At the forward end, the casing F is provided with three circumferentially spaced, inturned stop lugs 27—27—27, which are located at the corners of the casing between the friction surfaces 25. At the open rear end of the casing, the same is provided with three circumferentially spaced, inturned stop lugs 28—28—28, which are in longitudinal alignment with the front stop lugs 27—27—27.

The friction shoes G are three in number and are arranged symmetrically about the central longitudinal axis of the mechanism. Each shoe is laterally inwardly enlarged at its front end, said enlargement being indicated by 29. Each shoe has a longitudinally extending friction surface 30 on the outer side thereof of V-shaped, transverse section, which engages with the corresponding V-shaped friction surface 25 of the casing. On the inner side, the enlargement 29 of each shoe presents a flat wedge face 31, which is engaged by the wedge block H. The inner end of the enlargement 29 is substantially flat, thereby providing a transversely extending, flat abutment face 32 for the outer coil of the spring resistance K. The shoes G are elongated, as shown, each shoe being provided with a rearward extension 33, which, in the normal position of the shoe, terminates short of the rear end of the casing F. The extensions 33—33—33 of the shoes are transversely curved, as clearly shown in Figure 7.

The wedge block H is similar to the wedge block C hereinbefore described, having a flat front end face 34, three flat wedge faces 35—35—35 engaging the wedge faces 31—31—31 of the three shoes, respectively, a flat rear end face 36, and three radially outwardly extending lugs 37—37—37 engaging in back of the lugs 27—27—27 of the casing, and extending between adjacent shoes.

The spring cage J is in the form of a hollow cylinder open at its front end and closed at its rear end by a transverse wall 38. The wall 38 is extended laterally outwardly beyond the side wall of the cage and forms an annular flange 39 projecting from the cage. Although the member J of the mechanism has been described as a spring cage, it is, in effect, an elongated cap member. At the front end, the cylindrical spring cage J has three radially outwardly projecting lugs 40—40—40 which overlap and engage in back of the stop lugs 28—28—28 at the rear end of the casing F. The elongations or rearward extensions 33—33—33 of the three friction shoes extend rearwardly beyond the inner sides of the lugs 40—40—40 and engage between said lugs to block rotation of the cage J. In other words, the shoes act as locking means for preventing turning of the spring cage J with respect to the casing F, thereby maintaining the lugs 40 in alignment with the lugs 28. Inwardly of the front end thereof, the cylindrical spring cage is provided with a laterally outwardly projecting, annular stop flange 41, adapted to engage with the inner end of the casing F to limit compression of the mechanism.

The spring resistance K, which is disposed within the spring cage and extends into the casing F, comprises an inner light coil and an outer heavier coil. Both of the coils of the spring K bear at their rear ends on the transverse rear end wall 38 of the spring cage. The front end of the inner coil of the spring bears on the flat rear end face 36 of the wedge block, and the front end of the outer coil bears on the transverse inner end abutment faces 32—32—32 of the three friction shoes.

The steps of assembling the mechanism shown in Figures 5, 6, and 7 are substantially the same as those described in connection with the embodiment of the invention shown in Figures 1 to 4 inclusive, and therefore need no further detailed description.

The operation of the mechanism shown in Figures 5, 6, and 7 is as follows: Upon compression of the same between the front and rear followers of the railway draft rigging, the spring cage or cap J is forced inwardly by the rear follower of the rigging, against the resistance of the spring K, thereby providing light preliminary spring action during the first part of the compression stroke. During further compression of the mechanism, the flange 41 of the spring cage J comes into engagement with the inner end of the friction casing F, thereby compelling inward movement of the wedge block H during the remainder of the compression stroke of the mechanism. During inward movement of the wedge block, the shoes G—G—G are wedged apart and forced to slide inwardly on the friction surfaces of the casing F, against the resistance of the spring K, thereby providing the required high frictional resistance during the last part of the compression stroke. When the actuating force is reduced, the spring K restores all of the parts to the normal full release position shown in Figure 5, outward movement of the wedge block being limited by the lugs 37 thereof engaging the lugs 27 of the casing, and outward movement of the spring cage or cap J being limited by the lugs 40 thereof coming into engagement with the lugs 28 at the rear end of the casing F.

I claim:

1. In a friction shock absorbing mechanism, the combination with a friction casing open at both ends; of a friction clutch including a wedge block and friction shoes, said shoes being slidingly telescoped within one end of the casing, said block having wedging engagement with the shoes; cooperating guide means on said shoes and casing restricting the shoes to movement lengthwise of the casing; a spring cap telescoped within the other end of the casing; interengaging, longitudinally aligned stop shoulders on said casing and cap limiting outward movement of the latter; locking extensions on said shoes engaging the cap to lock the cap against rotation with respect to the casing to maintain said stop shoulders in longitudinal alignment; and spring means within the casing yieldingly opposing relative movement of the clutch and cap toward each other.

2. In a friction shock absorbing mechanism, the combination with a friction casing open at both ends, said casing having inturned, circumferentially spaced stop lugs at one end; of a spring cap slidingly telescoped within said end of the casing, said cap having radially outwardly projecting lugs corresponding in number to and longitudinally aligned with the lugs of the casing, said lugs of the cap being engageable with the lugs of the casing to limit outward movement of the cap; a friction clutch slidingly telescoped within the other end of the casing, said clutch including a wedge block and friction shoes, said shoes and casing having cooperating guide portions limiting the shoes to movement lengthwise of the casing, said shoes having rearward extensions engaged between the lugs of the cap to hold the latter against rotation with respect to the casing.

3. In a friction shock absorbing mechanism, the combination with a tubular friction casing open at both ends; of inturned, circumferentially spaced stop lugs at the front end thereof; inturned, circumferentially spaced, interior stop lugs at the rear end of the casing, said lugs being longitudinally aligned with the lugs at the front end of the casing; a friction clutch including a wedge block and a plurality of friction shoes, said friction shoes being slidingly engaged with the interior walls of the casing, said shoes and casing having interengaging, V-shaped friction surfaces restricting the shoes to movement lengthwise of the casing; radially extending stop lugs on said wedge block extending between adjacent shoes and engaging in back of the stop lugs at the front end of the casing to limit outward movement of said wedge block; a spring cap slidingly telescoped within the rear end of the casing; radially outwardly projecting stop lugs on the spring cap extending between adjacent shoes to hold the cap against rotation with respect to said shoes, said lugs of the cap engaging in back of the stop lugs at the rear end of the casing to limit outward movement of the cap; and spring means within the casing yieldingly opposing inward movement of the clutch and cap toward each other.

4. In a friction shock absorbing mechanism, the combination with a friction casing open at both ends, said casing having lengthwise extending, interior friction surfaces of V-shaped, transverse cross section; of a friction clutch including a wedge block and friction shoes, said shoes being slidingly telescoped within one end of the casing, said block having wedging engagement with the shoes, said shoes having friction surfaces of V-shaped, transverse section engaging the V-shaped surfaces of the casing to restrict said shoes to movement lengthwise of the casing; a spring cap telescoped within the other end of the casing; interengaging, longitudinally aligned stop shoulders on said casing and cap limiting outward movement of the latter; locking extensions on said shoes engaging the cap to lock the cap against rotation with respect to the casing to maintain said stop shoulders in longitudinal alignment; and spring means within the casing yieldingly opposing relative movement of the clutch and cap toward each other.

5. In a friction shock absorbing mechanism, the combination with a friction casing open at both ends, said casing having longitudinally extending, interior friction surfaces at said front end, said surfaces being of V-shaped, transverse section, said casing having inturned, circumferentially spaced stop lugs at one end; of a spring cap slidingly telescoped within said end of the casing, said cap having radially outwardly projecting lugs corresponding in number to and longitudinally aligned with the lugs of the casing, said lugs of the cap being engageable with the lugs of the casing to limit outward movement of the cap; a friction clutch slidingly telescoped within the other end of the casing, said clutch including a wedge block and friction shoes, said shoes having friction surfaces of V-shaped, transverse section engaging the friction surfaces of the casing for sliding movement thereon lengthwise of the mechanism, said shoes having rearward extensions engaged between the lugs of the cap to hold the latter against rotation with respect to the casing.

6. In a friction shock absorbing mechanism, the combination with a friction casing; of a friction clutch including friction shoes slidingly telescoped within one end of said casing, said shoes and casing having interengaging portions limiting the shoes to movement lengthwise of the casing; a sliding member telescoped within the other end of the casing; laterally outwardly projecting lugs on said member embracing and engaging said shoes on opposite side edges to limit movement of said member and shoes to a direction lengthwise of the mechanism; stop lugs on said casing longitudinally aligned with said lugs of said member to limit outward movement of the latter with respect to the casing; and spring means within the casing yieldingly opposing inward movement of said member.

7. In a friction shock absorbing mechanism, the combination with a tubular friction casing having interior friction surfaces extending lengthwise thereof; of a friction clutch slidingly telescoped within one end of the casing, said clutch including a central wedge member and shoes surrounding said member, said shoes having outer friction surfaces in lengthwise sliding engagement with the interior surfaces of the casing, the engaging surfaces of said shoes and casing being of interengaging guide and groove formation; a tubular follower member slidingly telescoped within the other end of the casing, said wedge member and follower member having radially outwardly projecting lugs extending between adjacent shoes to hold said members and shoes against relative rotation; inturned stop lugs at opposite ends of the casing with which said lugs of said members are engaged to limit outward movement of said members away from each other; and spring means within the casing yieldingly opposing inward movement of the clutch and follower member toward each other.

8. In a friction shock absorbing mechanism, the combination with a tubular friction casing having interior, lengthwise extending friction surfaces of V-shaped, transverse section arranged symmetrically about the longitudinal axis of the mechanism; of a friction clutch including a wedge block and the plurality of friction shoes, said shoes being slidable lengthwise within the casing, each shoe having a lengthwise extending friction surface of V-shaped, transverse section engaging one of the V-shaped friction surfaces of the casing, said wedge block being at one end of the casing and having wedging engagement with the shoes; a tubular follower member slidingly telescoped within the other end of the casing; spring means within the casing yieldingly opposing movement of the clutch and follower member toward each other; radially outwardly projecting lugs on said wedge block engaged between adjacent shoes for holding said block against rotation with respect to the shoes; radially outwardly projecting lugs on said member engaged between adjacent shoes for holding said member against rotation with respect to the shoes; circumferentially spaced, interior lugs at opposite ends of the casing, said lugs engaging between adjacent shoes and being in the paths of movement of said lugs of said member and wedge block, respectively, for limiting outward movement of said block and member away from each other.

GEORGE E. DATH.

REFERENCES CITED

The following references are of record in the file of this patent:

UNITED STATES PATENTS

| Number | Name | Date |
|---|---|---|
| 2,422,718 | Dath | June 24, 1947 |